United States Patent
Poddar et al.

(10) Patent No.: US 9,292,305 B2
(45) Date of Patent: Mar. 22, 2016

(54) DECLARATIVE INSTANCE BASED ACCESS CONTROL FOR APPLICATION RESOURCES WITH PERSISTED ATTRIBUTES AND STATE

(75) Inventors: Indrajit Poddar, Sewickley, PA (US); Anthony J. Nadalin, Austin, TX (US); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2538 days.

(21) Appl. No.: 12/013,867

(22) Filed: Jan. 14, 2008

(65) Prior Publication Data
US 2009/0183184 A1    Jul. 16, 2009

(51) Int. Cl.
*G06F 9/44*    (2006.01)
(52) U.S. Cl.
CPC .................................. *G06F 9/4435* (2013.01)
(58) Field of Classification Search
USPC .......................................... 719/328; 707/783
See application file for complete search history.

(56) References Cited

U.S. PATENT DOCUMENTS

| | | | |
|---|---|---|---|
| 2005/0210412 A1* | 9/2005 | Matthews et al. | 715/835 |
| 2005/0289342 A1* | 12/2005 | Needham et al. | 713/169 |
| 2006/0248083 A1* | 11/2006 | Sack et al. | 707/9 |
| 2006/0259614 A1* | 11/2006 | Patrick | 709/224 |
| 2008/0133530 A1* | 6/2008 | Wang et al. | 707/9 |

* cited by examiner

*Primary Examiner* — Sherief Badawi
*Assistant Examiner* — Christopher J Raab
(74) *Attorney, Agent, or Firm* — Steven M. Greenberg, Esq.; CRGO Law

(57) ABSTRACT

Embodiments of the present invention provide a method, system and computer program product for declarative instance based access control for persistent application resources in a multi-tier application. In one embodiment of the invention, a method for instance based access control in a persistent application resource can be provided. The method can include creating one or more instances of an persistent application resource for a particular user or based on attributes of the user, coupling the instance(s) of the persistent application resource to a database implementing row-level access control, initializing access to the database according to a role or attribute for the particular user, and accessing a restricted set of data in the database through the instance(s) of the persistent application resource.

14 Claims, 1 Drawing Sheet

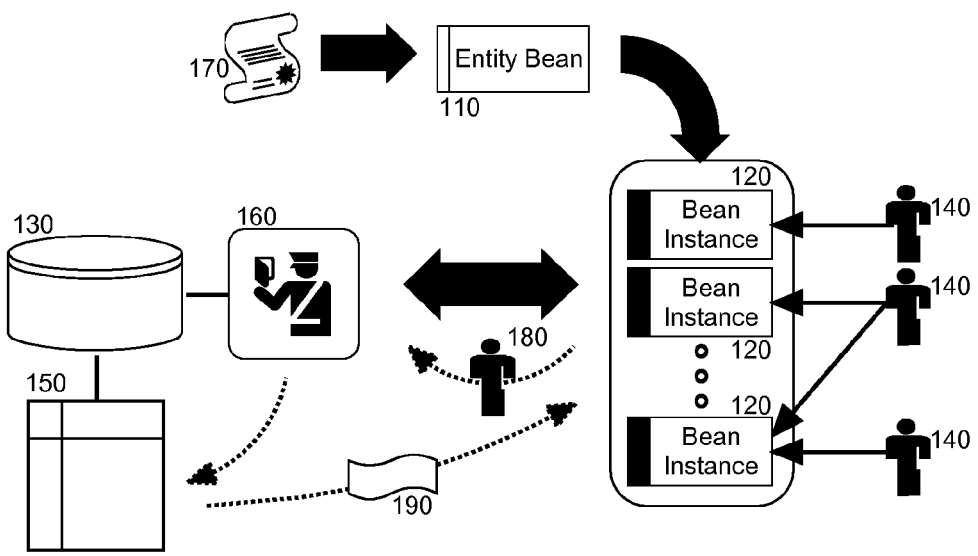
FIG. 1
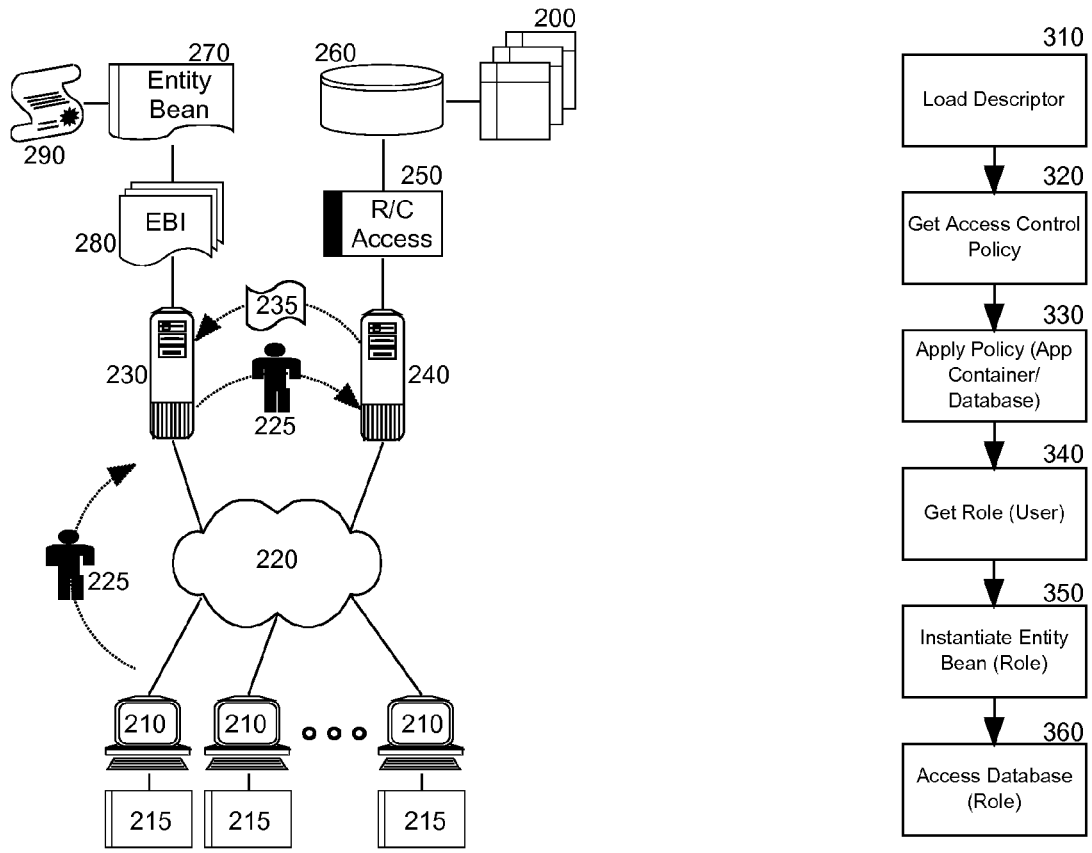
FIG. 2
FIG. 3

DECLARATIVE INSTANCE BASED ACCESS CONTROL FOR APPLICATION RESOURCES WITH PERSISTED ATTRIBUTES AND STATE

BACKGROUND OF THE INVENTION

1. Field of the Invention

The present invention relates to the field of multi-tier application management and more particularly to persistent application resource access control in a multi-tier application.

2. Description of the Related Art

A multi-tier application is an application structurally distributed across a computer communications network. In a multi-tier application, the interface, data storage, and the logical functionality of the application can be spread across one or more computing units and each can be configured to interact with one another in concert to produce the effect of a unitary application. Different layers of a multi-tier application can communicate with one another, receiving input for processing and producing output to be provided to a different layer of the application.

Functional layers of a multi-tier application include a persistence layer in which application data is stored in a sensible, organized way, an accessor layer in which database access logic can be implemented to interact with the persistence layer, a logic layer processing user input and stored data to produce a useful result, and a presentation layer configured to present the useful result to an interacting end user. Additionally, a requestor/consumer layer can be provided through which an end user can interact with the application. Typically, a Web browser or heavy client acts as the requestor/consumer layer. Of note, security considerations must be applied at all layers of a multi-tier application.

Security considerations implicate not only data access, but also data processing and data transmission. Within a multi-tier application, data can be accessed through application components in the logic layer as well as through the database management system in the persistence layer. Therefore, in order to provide comprehensive security in a multi-tier application both the logic layer and persistence layer must be accounted for. When providing comprehensive security for a multi-tier application, fine grained access control must be supported. Fine grained access control refers to role based access to data and data processing facilities.

In this regard, in a multi-tier architecture, persistent application resources such as the enterprise Java™ bean (EJB) (Java is a trademark of Sun Microsystems, Inc. of Santa Clara, Calif.), reside in the logic layer and provide persistent access to data in the persistence layer. Method permissions for persistent application resources support permission based access to the data processing facilities of persistent application resources. However, fine grained access control is supported by method permissions only in so far as a type and EJB method is specified. Fine grained access control on an instance-by-instance basis of an persistent application resource, however, is not supported.

Instance based access control is known to support fine grained access control in a single tier application. In instance based access control, different instances of a persistent application resource e.g. a J2EE entity bean associated with the roles of different accessors support different levels of security. Hence, instance based access control implements fine grained access control. Yet it is often necessary to specify access control policies differently for each instance of a persistent application resource. Examples include the differentiated computation and presentation of interest rates for different types of bank customers encapsulated in different instances of a persistent application resource with one interest rate quoted to one bank customer not being visible by another bank customer.

At present, instance based access control for persistent application resources can be achieved by encoding customized logic within each persistent application resource method. The customized logic can include program code enabled to compare the identity of an accessor to an attribute of the current persistent application resource instance before executing the business logic. Such a solution, however, can be difficult to configure in so far as code changes to the persistent application resource are required to support instance based access control. Code changes, as the skilled artisan will recognize, defeat the extensibility of a multi-tier application.

BRIEF SUMMARY OF THE INVENTION

Embodiments of the present invention address deficiencies of the art in respect to instance based access control for persistent application resources with persistent attributes and state in a multi-tier application and provide a novel and non-obvious method, system and computer program product for declarative instance based access control for persistent application resources in a multi-tier application. In one embodiment of the invention, a method for instance based access control in such a persistent application resource can be provided. The method can include creating an instance of an persistent application resource intended to be accessed by a particular user, coupling the instance of the persistent application resource to a database implementing row-level access control, initializing access to the database according to a common role for the particular user in both the middleware tier and the database tier, and accessing data in the database through the instance of the persistent application resource.

In one aspect of the embodiment, the method further can include reading access control restrictions for the persistent application resource, and transforming the access control restrictions into a label based row-level access control configuration for the database. In this regard, reading access control restrictions for the persistent application resource can include reading access control restrictions from a descriptor for the persistent application resource. Alternatively, reading access control restrictions for the persistent application resource can include reading access control restrictions from an extensible access control markup language (XACML) document for the persistent application resource. Finally, in yet another aspect of the embodiment, transforming the access control restrictions into a label basedrow-level access control configuration for the database can include generating structured query language (SQL) queries generated for the persistent application resource to enforce instance-based authorization policies of the access control restrictions.

In another embodiment of the invention, a multi-tier application data processing system can be configured for instance based access control. The system can include role based access control restrictions for both persistent application resource instances of an persistent application resource and data in tables in a database managed by a database management server (DBMS) including row-level access control. In particular, the database can include a label based configuration according to the role-based access control restrictions. The system also can include an application server coupled to the DBMS and hosting a container for the persistent application resource instances. Each of the instances can be configured for data access in the database according to a role for a requesting user.

In one aspect of the embodiment, the access control restrictions can be disposed in a descriptor for the persistent application resource. For example, the access control restrictions can be disposed in an XACML document. In another aspect of the embodiment, the row-level access control can be label-based access control (LBAC). In yet a further aspect of the embodiment, the row-level access control can be label security with role-based access.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of declarative instance based access control for persistent application resources in a multi-tier application;

FIG. 2 is a schematic illustration of a multi-tier application data processing system configured for declarative instance based access control for persistent application resources; and, FIG. 3 is a flow chart illustrating a process for declarative instance based access control for persistent application resources in a multi-tier application.

DETAILED DESCRIPTION OF THE INVENTION

Embodiments of the present invention provide a method, system and computer program product for declarative instance based access control for persistent application resources in a multi-tier application. In accordance with an embodiment of the present invention, different persistent application resource instances of a persistent application resource can be coupled to different rows in a table in a database and the table rows can be access control configured for row level security according to user identity. Each persistent application resource instance can source an authorization policy declared in a descriptor for the persistent application resource or in an annotation to source code and each user identity associated with a corresponding one of the persistent application resource instances can be passed to the database. Consequently, access to data in the table can be limited to those rows permitted by the access control for table. In this way, instance based access control can be achieved for the persistent application resource.

In further illustration, FIG. 1 is a pictorial illustration of declarative instance based access control for persistent application resources in a multi-tier application. As shown in FIG. 1, an persistent application resource 110 in the logic layer of the multi-tier application can be configured for persistent access to a table 150 in a database 130 in the persistence layer of the multi-tier application. One or more persistent application resource instances 120 can be instantiated from the persistent application resource 110 in association with corresponding requesting users 140. Each of the users 140 can fulfill a role 180 in the multi-tier application, for example a customer, manager, etc. Notably, an authorization policy for the different roles can be declared in descriptor 170 packaged with the persistent application resource 110. The authorization policy can indicate which data an end user 140 fulfilling a particular role can access in the table 150.

Access to the database 130 can be managed according to a database access control 160. Database access control 160 can limit access to data in the table 150 on a row and column level of granularity according to a specified role. In this regard, the database access control 160 can implement mandatory access control for row-level security, for example label-based access control (LBAC), or Oracle™ label security (OLS) with role based access control (Oracle is a trademark of Redwood Shores, Calif.), though the skilled artisan will recognize other such equivalent row-level security access control mechanisms with other database management system manufacturers.

In operation, a bean instance 120 can request access to data in the table 150 in association with a particular role 180 for a requesting user 140. Database access control 160 can process the particular role 180 to provide row-level access to data in the table 150 according to the particular role 180. Thereafter, the database 130 can return the requested data 190 to the bean instance 120. Importantly, each bean instance 120 for the persistent application resource 110 can enjoy different access authorization depending upon a corresponding user 140 and respective role 180 provided to the database access control 160. In this regard, each bean instance 120 can be created corresponding only to those rows in the database which are accessible to the requesting user 140. In this way, instance based access control can be achieved for the persistent application resource 110.

The declarative instance-based access control shown in FIG. 1 can be implemented within a multi-tier application data process system. In illustration, FIG. 2 depicts a multi-tier application data processing system configured for declarative instance based access control for persistent application resources. As shown in FIG. 2, an application server 230 and a database management system (DBMS) 240 can be configured for communicative coupling to one or more or accessing clients 210 over computer communications network 220. Each of the accessing clients 210 can include a browser client 215 configured to access program logic in the application server 230.

The application server 230 can support the execution of one or more persistent application resource instances 280 created from persistent application resource 270. The DBMS 240, in turn, can support access to data 235 in one or more tables 200 in database 260. Notably, the DBMS 240 can include row-level access control 250 implementing mandatory access control for row-level security. Accordingly, access to data 235 within the tables 200 can be limited on a row and column basis according to user identity or role 225. Likewise, the application server 230 can support access control restrictions 290 on the logic of the persistent application resource instances 280. In particular, the access control restrictions 290 can be embodied declaratively within a descriptor for the persistent application resource 270, or even in an extensible access control markup language (XACML) compliant document for the persistent application resource 270.

For instance, in descriptor form, the access control restrictions 290 can include:

```
<assembly-descriptor>
    <security-role>
        role-name>MortgageRatesCustomer</role-name>
    </security-role>
    <method-permission>
        <role-name>MortgageRatesCustomer</role-name>
        <method>
            <ejb-name>MortgageRates</ejb-name>
            <method-name>*</method-name>
        </method>
        <condition>
            <cmp-field>
                <field-name>cust_id</field-name>
                <field-value>CALLER_SUBJECT.NAME</field-value>
            </cmp-field>
        </condition>
    </method-permission>
    ....
</assembly-descriptor>
```

As shown above, the deployment descriptor embedded authorization policy specifies that only users in the role "MortgageCustomer" are permitted to invoke all methods of the bean "MortgageRates" under the condition that the container managed persistence (CMP) field cust_id matches the NAME attribute of the caller Subject.

By comparison, an XACML version of the access control restrictions 290 can be specified as follows:

```
<Rule RuleId="role-based-rule0" Effect="Permit">
<Target>
<Subjects><Subject>
<SubjectMatch MatchId="urn:function:role-match">
<AttributeValue DataType="string">
MortgageRatesCustomer</AttributeValue>
    <SubjectAttributeDesignator AttributeId="urn:names:tc:1.0:subject:subject-id"
DataType="urn:xacml-java-security:data-type:java.security.Principal" />
    </SubjectMatch>
</Subject></Subjects>
<Resources> <AnyResource/> </Resources>
<Actions><AnyAction /> </Actions>
</Target>
<Condition>
<Apply FunctionId ="urn:names:tc:xacml:1.0:function:and">
<Apply FunctionId="urn:xacml-java-security:java.security.Permission:match">
<Apply FunctionId="urn:xacml-java-security:java.security.Permission:bag">
<AttributeValue DataType="urn:xacml-java-security:data-type:java.security.Permission">
<AttributeValue DataType="javax.security.jacc.EJBMethodPermission">
<AttributeValue DataType="string"
Name="Actions">findByPrimaryKey,LocalHome,ejbs.RatesKey</AttributeValue>
<AttributeValue DataType="string" Name="Name">MortgageRates</AttributeValue>
</AttributeValue></AttributeValue>
<AttributeValue DataType="urn:xacml-java-security:data-type:java.security.Permission">
<AttributeValue DataType="javax.security.jacc.EJBMethodPermission">
<AttributeValue DataType="string" Name="Actions">,Local</AttributeValue>
<AttributeValue DataType="string" Name="Name">MortgageRates</AttributeValue>
</AttributeValue></AttributeValue>
</Apply> </Apply>
<Apply FunctionId="urn:function:entity-ejb-cmp-field-principal-name-match">
<AttributeValue DataType="string" Name="EntityEJBName">MortgageRates</AttributeValue>
<AttributeValue DataType="string" Name="CMPFieldName">cust_id</AttributeValue>
    <SubjectAttributeDesignator AttributeId="urn:names:tc:1.0:subject:subject-id"
DataType="urn:xacml-java-security:data-type:java.security.Principal" />
</Apply>
</Apply></Condition></Rule>
```

As shown in the example, the function: urn: function:entity-ejb-cmp-field-principal-name-match matches the name of the caller subject principal with the value of the cust-id CMP field in the MortgageRates persistent application resource. This added function can be applied in conjunction with the java.security.Permission matching functions for the EJBMethodPermission for the MortgageRates persistent application resource.

In operation, at deployment time the access control restrictions 290 can be transformed into authorization configuration for a container in the application server 230 and also a row level access control configuration for the row-level access control 250 of the DBMS 240. Optionally, to the extent that the DBMS 240 does not support row-level access control policies then structured query language (SQL) queries generated for the persistent application resource 270 can be modified to enforce the instance-based authorization policies of the access control restrictions 290.

In more particular illustration, FIG. 3 is a flow chart illustrating a process for declarative instance based access control for persistent application resources in a multi-tier application. Beginning in block 310, a descriptor can be loaded or in the alternative, annotations can be parsed, for the persistent application resource before creating an instance of the persistent application resource. In block 320, an access control policy can be retrieved for the persistent application resource and in block 330 the policy can be transformed into authorization configuration for the J2EE container and row level access control configuration for the database. Thereafter, in block 340, a role can be determined for the user and in block 350, one or more instances of persistent application resources can be created for the role and corresponding to the restricted set of table rows in connection with a table in corresponding database. Finally, in block 360, the data in the restricted set of table rows can be accessed according to the role passed into the corresponding database. In this regard, the database can utilize row-level access control to limit portions of the table accessible to the persistent application resource instance in view of the role provided to the row-level access control in the database. In this way, instance based access control for the persistent application resource can be achieved.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for declarative instance based access control for persistent application resources in a multi-tier application, the method comprising:
   retrieving an access control policy for a persistent application resource in a logic layer of the multi-tier application from an access control policy descriptor or annotations for the persistent application resource;
   transforming the retrieved access control policy into a row level access control configuration for accessing a database in a persistence layer of the multi-tier application;
   instantiating from the persistent application resource one or more persistent application resource instances in association with corresponding requesting users;
   coupling the instances of the persistent application resource to corresponding rows of the row level access control configuration;
   initializing access to the database according to one of a role and a privilege of a particular user; and,
   accessing a restricted set of data in the database through a corresponding instance of the persistent application resource.

2. The method of claim 1, wherein the row level access control configuration implements label-based access control (LBAC).

3. The method of claim 1, wherein the row level access control configuration implements label security with role-based access.

4. The method of claim 1, wherein the access control policy descriptor is an extensible access control markup language (XACML) document for the persistent application resource.

5. The method of claim 1, wherein the transforming step further comprises generating structured query language (SQL) queries generated for the persistent application resource to enforce instance-based authorization policies of access control restrictions.

6. A data processing system for declarative instance based access control for persistent application resources in a multi-tier application, the system comprising a processor configured to perform:
   retrieving an access control policy for a persistent application resource in a logic layer of the multi-tier application from an access control policy descriptor or annotations for the persistent application resource;
   transforming the retrieved access control policy into a row level access control configuration for accessing a database in a persistence layer of the multi-tier application;
   instantiating from the persistent application resource one or more persistent application resource instances in association with corresponding requesting users;
   coupling the instances of the persistent application resource to corresponding rows of the row level access control configuration;
   initializing access to the database according to one of a role and a privilege of a particular user; and,
   accessing a restricted set of data in the database through a corresponding instance of the persistent application resource.

7. The system of claim 6, wherein the access control policy descriptor is an extensible access control markup language (XACML) document.

8. The system of claim 6, wherein the row-level access control configuration implements label-based access control (LBAC).

9. The system of claim 6, wherein the row-level access control configuration implements label security with role-based access.

10. A computer program product comprising a non-transitory computer usable storage medium stored thereon computer usable program code for declarative instance based access control for persistent application resources in a multi-tier application, the computer usable program code, when executed by a computer, causes the computer to perform the steps of:

retrieving an access control policy for a persistent application resource in a logic layer of the multi-tier application from an access control policy descriptor or annotations for the persistent application resource;

transforming the retrieved access control policy into a row level access control configuration for accessing a database in a persistence layer of the multi-tier application;

instantiating from the persistent application resource one or more persistent application resource instances in association with corresponding requesting users;

coupling the instances of the persistent application resource to corresponding rows of the row level access control configuration;

initializing access to the database according to one of a role and a privilege of a particular user; and accessing a restricted set of data in the database through a corresponding instance of the persistent application resource.

11. The computer program product of claim 10, wherein the row level access control configuration implements label-based access control (LBAC).

12. The computer program product of claim 10, wherein the row level access control configuration implements label security with role-based access.

13. The computer program product of claim 10, wherein the access control policy descriptor is an extensible access control markup language (XACML) document for the persistent application resource.

14. The computer program product of claim 10, wherein the transforming step further comprises generating structured query language (SQL) queries generated for the persistent application resource to enforce instance-based authorization policies of access control restrictions.

* * * * *